(12) United States Patent
Woodhams

(10) Patent No.: US 8,757,724 B2
(45) Date of Patent: Jun. 24, 2014

(54) SEATING DEVICE

(76) Inventor: Gregory J. Woodhams, Mattawan, MI (US)

(*) Notice: Subject to any disclaimer, the term of this patent is extended or adjusted under 35 U.S.C. 154(b) by 340 days.

(21) Appl. No.: 13/068,173

(22) Filed: May 4, 2011

(65) Prior Publication Data
US 2014/0015291 A1  Jan. 16, 2014

(51) Int. Cl.
*A47C 9/10* (2006.01)

(52) U.S. Cl.
USPC ...................................... 297/451.3

(58) Field of Classification Search
USPC .......... 297/4, 217.7, 451.3, 451.4; 182/116, 182/128, 136
See application file for complete search history.

(56) References Cited

U.S. PATENT DOCUMENTS

| | | | | |
|---|---|---|---|---|
| 2,549,679 A * | 4/1951 | Foote | ............ | 182/187 |
| 2,722,968 A * | 11/1955 | Smith | ............ | 182/187 |
| 3,927,733 A * | 12/1975 | Wurn et al. | ............ | 182/187 |
| 4,705,143 A * | 11/1987 | Ziemba | ............ | 182/187 |
| 5,293,657 A * | 3/1994 | DeAth | ............ | 5/127 |
| 5,720,522 A * | 2/1998 | Habeck | ............ | 297/337 |
| 6,155,646 A * | 12/2000 | Sisson | ............ | 297/451.4 |
| 6,328,131 B1 * | 12/2001 | Backus | ............ | 182/187 |
| 6,871,911 B2 * | 3/2005 | Alexander, Jr. | ............ | 297/344.18 |
| 7,258,401 B2 * | 8/2007 | Smith | ............ | 297/463.2 |
| 7,290,552 B1 * | 11/2007 | Eisbrenner | ............ | 135/90 |
| 2005/0225126 A1* | 10/2005 | Frederick | ............ | 297/4 |
| 2009/0179478 A1* | 7/2009 | Frady | ............ | 297/452.55 |
| 2010/0187867 A1* | 7/2010 | McCabe | ............ | 297/16.1 |

* cited by examiner

*Primary Examiner* — Philip Gabler

(57) ABSTRACT

The device of present invention is seating device that is incorporated into a pack. The pack carries the component parts of the seating device for carrying the device afield. The seating device is deployed with the pack fitting securely under the seating device and capable of holding more cargo than just the seating device. The device uses various belt configurations to secure the seating device to tree, pole or post for deployment. The legs of the device also have various embodiments including sectional legs that are also stored within the pack.

37 Claims, 10 Drawing Sheets

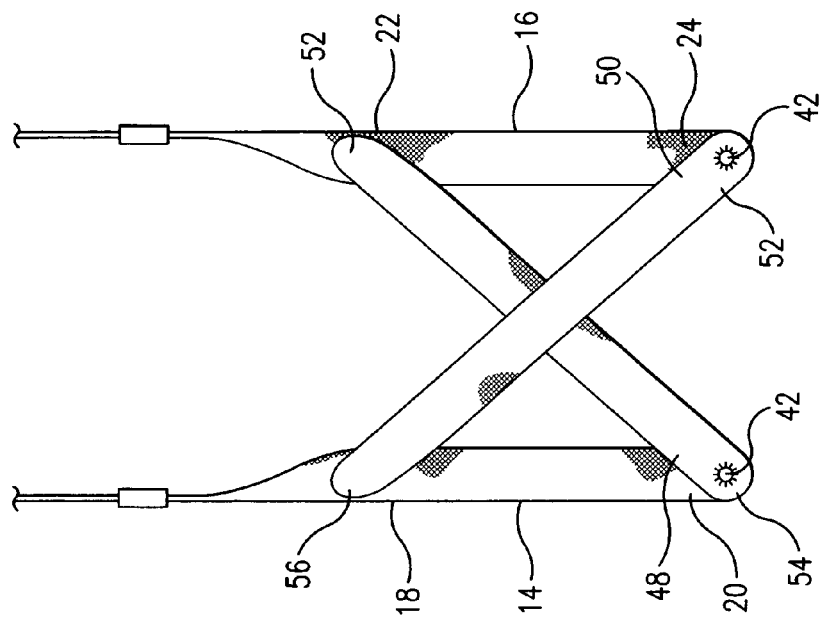
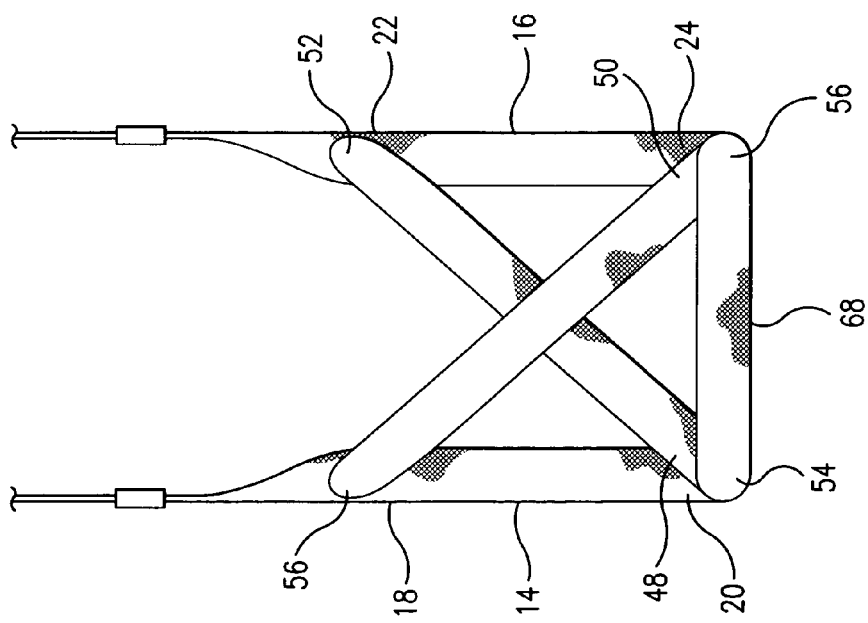

SEATING DEVICE

BACKGROUND OF THE INVENTION

The instant invention is a seating device that is incorporated into a fanny pack or pack. The seat has an absolute utility over the prior art in that it is compact and sturdy. It has been discovered that the seat can also be incorporated with sticks for legs making it even more convenient for the user. The belts of the pack double as the tree support and seat support. When deployed the pack portion is conveniently stored under the seat portion so the pack is out of the way but close enough to be accessed when sitting. The seating device provides sturdy seating and storage for hunting, fishing, hiking as well as other outdoor activities.

THE INVENTION

The instant invention is a seating device. The device comprises in combination, two support legs, a pair of side belts, each belt has a near end and a distal end, a pair of cross belts, each belt has a near end and a distal end. The device also has a first securing belt. This first securing belt has a near end and a distal end. The device also has a second securing belt. This second securing belt has a near end and a distal end.

The cross belts are fixedly attached to a side belts such that each near end of a cross belt is fixedly attached to a near end of a side belt to form a first junction with a bottom surface. Each distal end of each cross belt is fixedly attached to a distal end of a side belt.

The distal end of each side belt is fixedly attached to a near end of a securing belt such that they formed from the distal end of each cross belt and distal end of each side belt and the near end of each securing belt, a second junction. Further, each first junction has a receptacle for holding a leg.

BRIEF DESCRIPTION OF THE DRAWINGS

FIG. 11 is a top view of a belt configuration for a two legged seat with cross belt and a front support belt.

FIG. 12 is a top view of a belt configuration for a two legged seat with cross belt and a support belt and openings therethrough for the support legs.

DETAILED DESCRIPTION OF THE DRAWINGS

Figure 1:
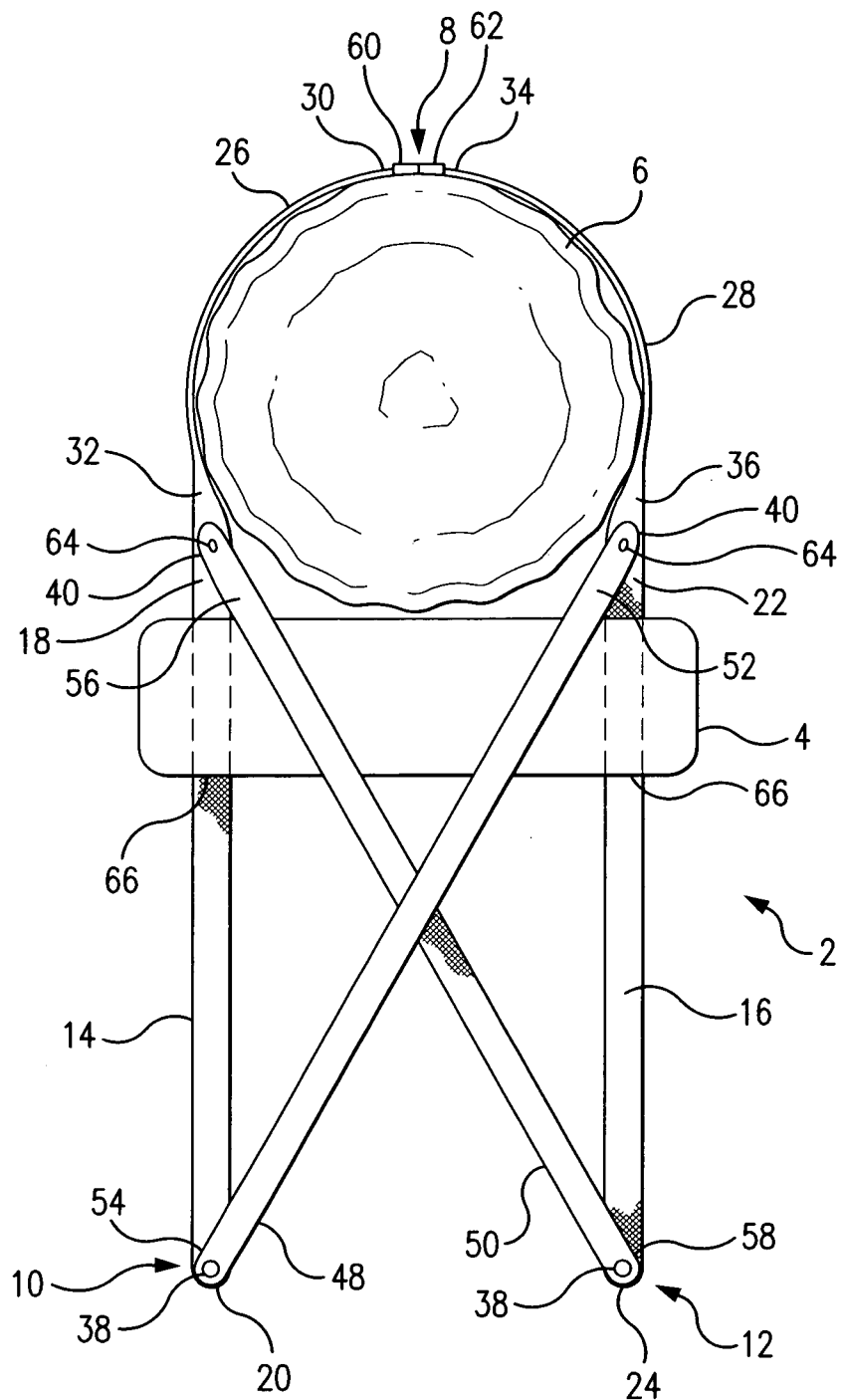
FIG. 1 is a top view of the seating device featuring the main embodiment.

FIG. 1 is a top view of the seating device 2 featuring the main embodiment. The seating device 2 is a portable pack 4 that contains a deployable seat within. The user locates an appropriate position to deploy the seat. The seat of the seating device 2 is removed from the pack 4 and placed next to a tree 6. The first cross belt 14 and the second cross belt 16 are joined at the back side of the tree 6 and secure via the buckle 8. This should snug the pack 4 against the tree 6. The seat 2 is then unraveled and pulled away from the tree 6. The near end 20 of the first side belt 14 has a leg 10 (not shown) attached and is placed upright. The near end 24 of the second belt 16 has a leg 12 (not shown) attached and is placed upright.

The distal end 18 of the first side belt 14 is attached to the distal end 32 of the first securing belt 26 and the distal end 32 has a female buckle end 60 attached to it. The near end 36 of the second securing belt 28 is attached to the near end 32 of the second side belt 16 and the distal end 34 has a male buckle end 62 attached to it. The integration of the female buckle end 60 and the male end 62 form the buckle 8.

The first cross belt 48 is attached at its near end 52 by a fastener 64 at the second side belts 16 at its distal end 22 and runs on a diagonal to the near end 20 of the first side belt 14 where it is secured by fastener 64, sewing or stapling. The second cross belt 50 is attached at its near end 56 by a fastener 64 at the first side belts 14 at its distal end 18 and runs on a diagonal to the near end 24 of second side belt 16 where it is secured by fastener either by sewing or stapling.

The first side belt 14 and the second side belt 16 pass through slot 66 in the front and rear of the top 70 the pack 4.

Figure 2:
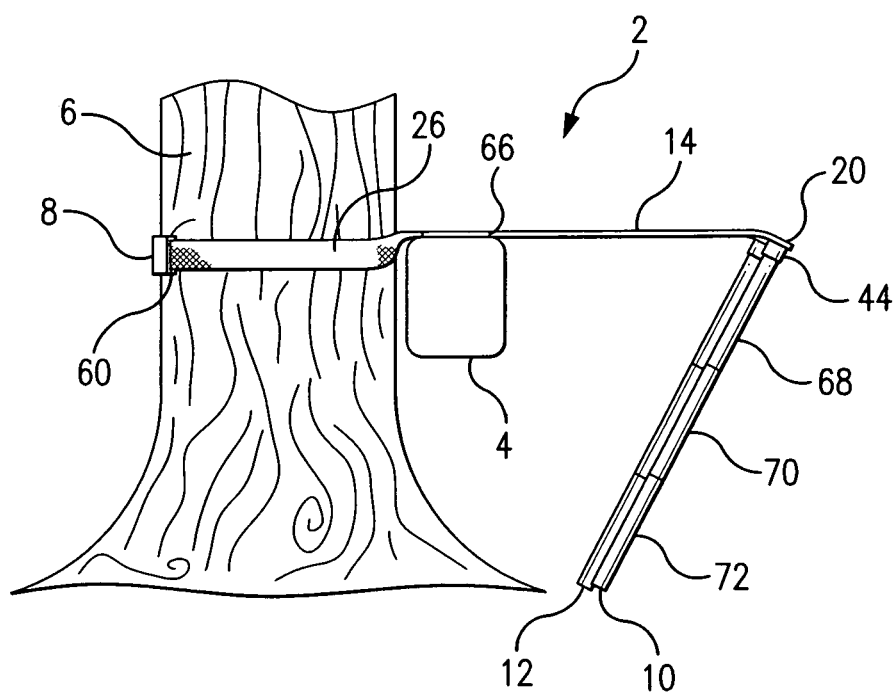
FIG. 2 is a side view of the seating device with two support legs.

FIG. 2 is a side view of the seating device 2 with two support legs 10 and 12. The first securing belt 26 and its female end 60 are connected at the buckle 8 around the tree 6. The first securing belt 14 runs through the pack 4 in the slot 66 then on to the first securing belt 26. The near end 20 of the first side belt 14 has a cup 44 for accepting the leg 10. The legs 10 and 12 of the seating device 2 in this embodiment are segmented sections 68, 70 and 72. The leg segments 68, 70 and 72 are designed to break down and fit into the pack 4 when not assembled. In other embodiment the legs are one piece, in another embodiment the legs are sticks or tree branches that are gathered from the locality of use.

Figure 3:
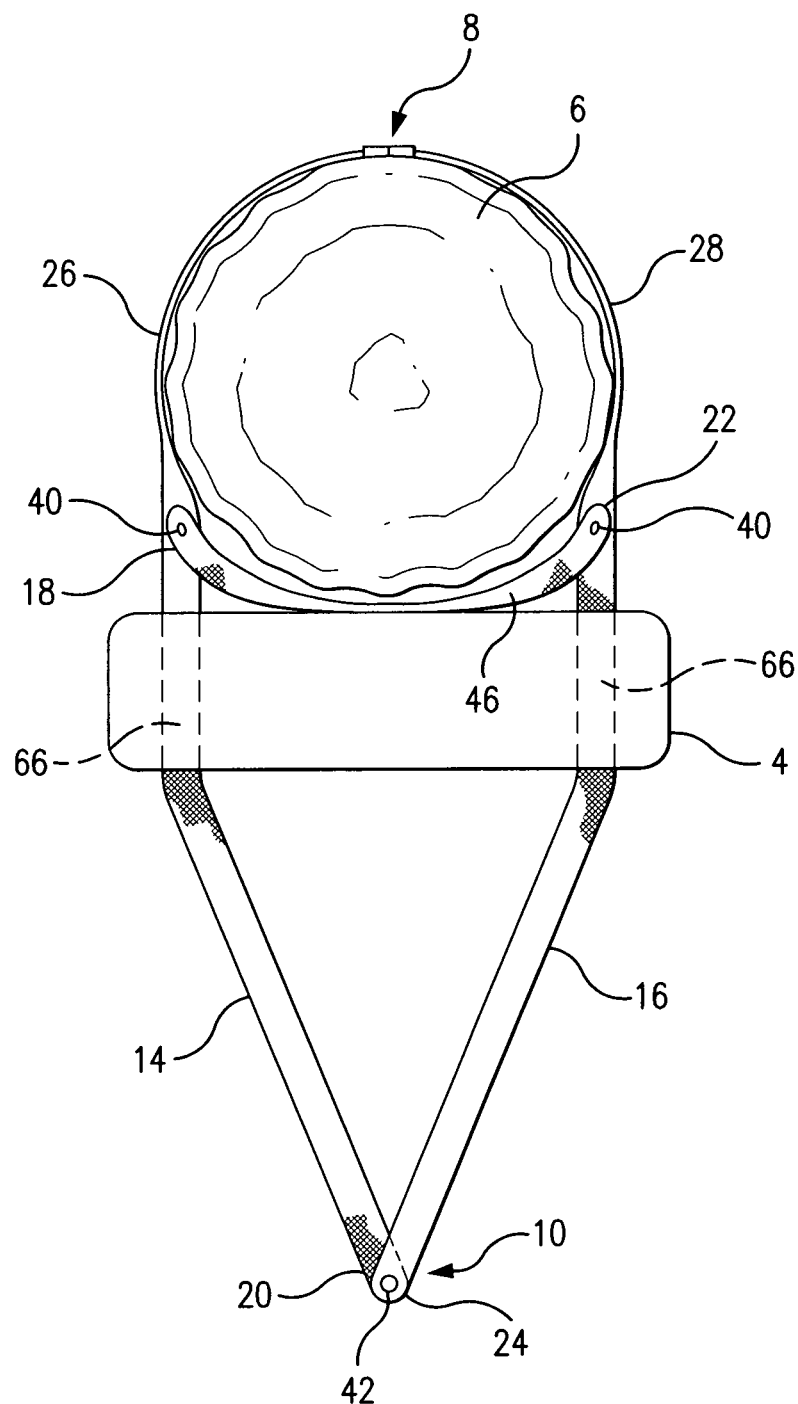
FIG. 3 is a top view of the seating device with a single support leg.

FIG. 3 is a top view of the seating device 2 with a single support leg 10. This embodiment entails a single leg 10 and no cross belts. Instead of the cross belt configuration of the previous embodiment this version has a support belt 46. Another variation on this embodiment has instead of a cup 44 for leg 10 attachment there are reinforced openings 42 that accept the leg 10. The first securing belt 26 with its female buckle end 60 are connected to the male buckle end 62 that join together forming the buckle 8. The male buckle 62 is secured to the second securing belt 28. This connection allows the device 2 to surround the tree 6. The first side belt 14 is joined to the first securing belt 26 at the second junction 40. The second side belt 16 is joined to the second securing belt 28 at the second junction 40. The first side belt 14 slides through the slot 66 just before it is joined at the second junction 40. The same is to be said for the second side belt 16 which passes through the slot 66 just before the second junction 40. The support belt 46 runs from one second junction 40 to the other the second junction 40. The near end 20 of the first side belt 14 meets the near end 24 of the second securing belt 16 where they are combined to form a first junction 40 by sewing in this embodiment. This meeting of the near end 20 and 24 also form the reinforced opening 42 that accepts the leg 10.

Figure 4:
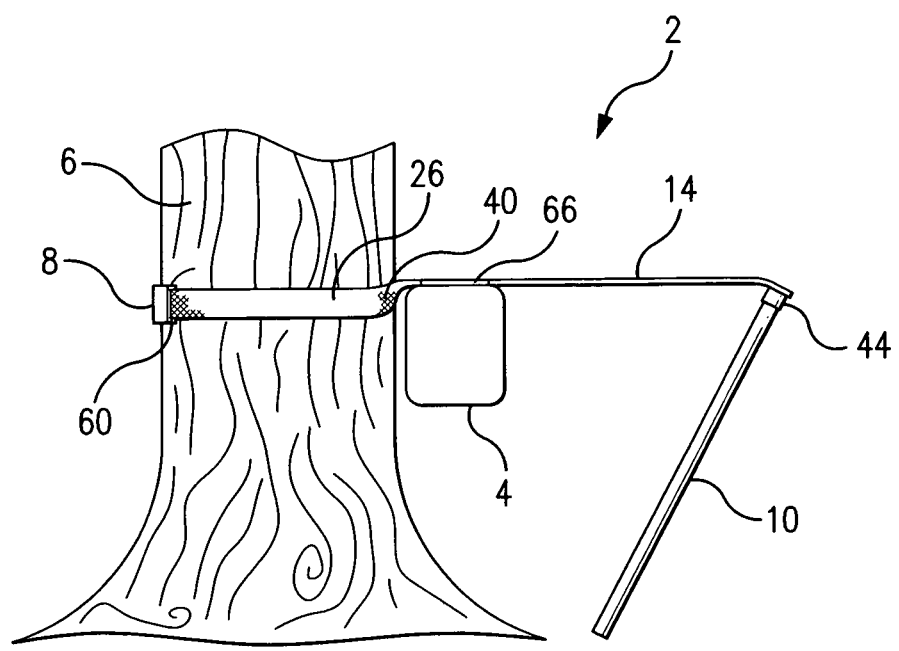
FIG. 4 is a side view of the seating device with a single support leg.

FIG. 4 is a side view of the seating device 2 with a single support leg 10. This embodiment is the single leg 10 embodiment. The buckle 8 connects the first securing belt 26 and the second securing belt 28 (not Shown). The first securing belt 26 joins the first side belt 14 at the second junction 40. The first side belt 14 slides through the slot 66 just prior to the second junction 40. The near end 20 of the first side belt 14 meets the distal end 24 of the second side belt 16 and there is a cup 44 attached at the terminus of both the near end 20 and the near end 24. This cup 44 is designed to accept the leg 10. The leg 10 in this embodiment is a stick or tree branch that was scavenged from the immediate area. This embodiment allows the use to carry the pack without the added weigh of the leg which is almost inconsequential.

Figure 5:
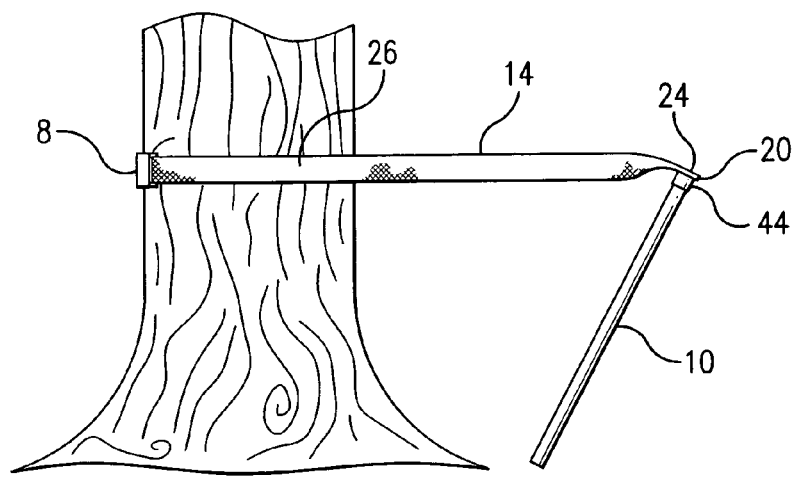
FIG. 5 is a side view of the seating device without a pack.

FIG. 5 is a side view of the seating device 2 without a pack 4. This embodiment is a seat without the convenience of having the pack 4. The seating device 2 is carried into the woods then assembled. It has only two component parts. The two components are the seat 2 and a leg 10. If the user chooses to not take a leg and find one in the local environment for deploying the seat 2, then the seat is small enough to fit in the user's pocket. This embodiment has a buckle 8 that connects the first securing belt 26 to the second securing belt 28 (not shown). The first securing belt 26 and the first side belt 14 are one continuous belt in this embodiment. The second side belt 16 and the second securing belt 28 are one continuous belt as well (not shown). The near end 20 of the first side belt 14 and the near end 24 of the second side belt are joined where the cup 44 is attached. The cup 44 is designed to accept the leg 10.

Figure 6:
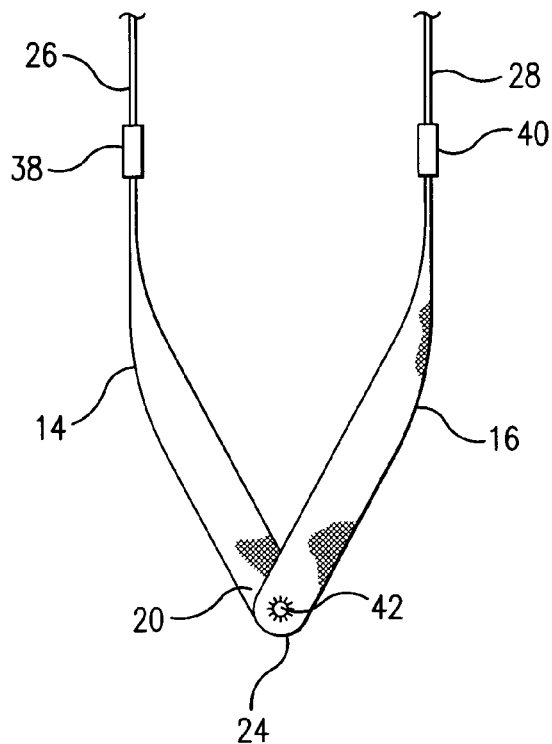
FIG. 6 is a top view of the belt configuration for a single support leg.

FIG. 6 is a top view of the belt configuration for a single support leg 10 of FIG. 5. This is most simplistic configuration of belts for the seating device 2. The first securing belt 26 is joined to the first side belt 14 at junction 38. The second securing belt 28 and the second side belt 16 are joined at the second junction 40. The near end 20 of the first side belt 14 and the near end 24 of the second side belt 16 are joined to form the reinforced opening 42. This view provides a clear look at the reinforced opening 42. Again this embodiment has no pack 4.

Figure 7:
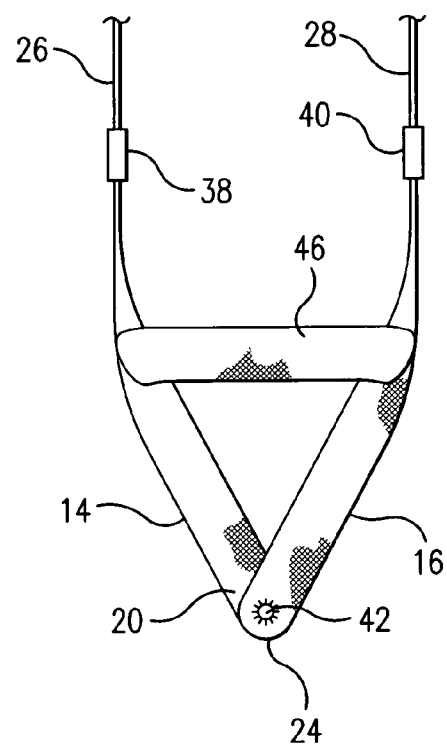
FIG. 7 is a top view of the belt configuration for a single support leg with a cross belt for support.

FIG. 7 is a top view of the belt configuration for a single support leg 10 with a cross belt 46 for support. The first securing belt 26 is joined to the first side belt 14 at second junction 40. The second securing belt 28 and the second side belt 16 are joined at the second junction 40. The near end 20 of the first side belt 14 and the near end 24 of the second side belt 16 are joined at the first junction 38 to form the reinforced opening 42. This view provides a clear look at the reinforced opening 42. The cross belt 46 runs from the first side belt 14 to the second side belt 16. Again this embodiment has no pack 4.

Figure 8:
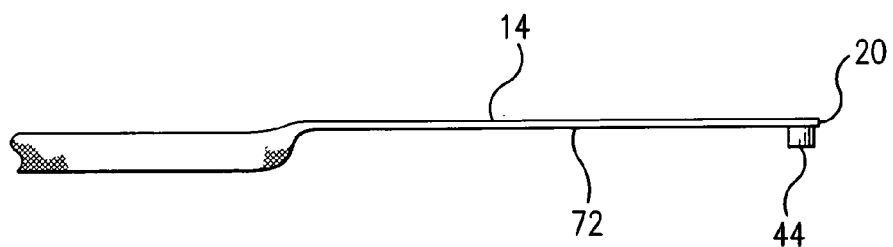
FIG. 8 is a side view of a leg end cap.

FIG. 8 is a side view of a leg cup 44. This view provides a clear look at the cup 44 without a leg 10 inserted. The cup 44 is attached where the near end 20 of a side belt 14 and the near end 24 of the second side belt 16 come together forming the first junction 38. There is an opening 42 therethrough here for leg 10 insertion.

Figure 9:
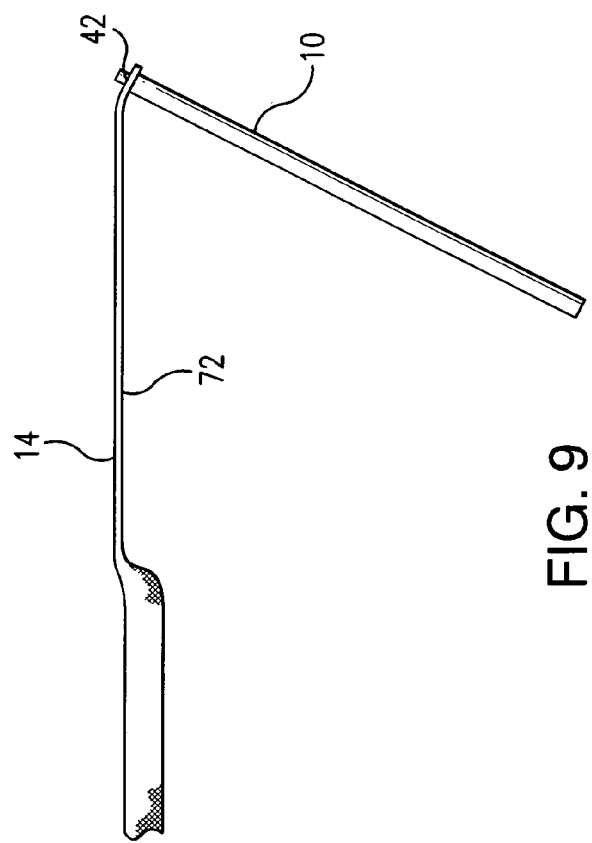
FIG. 9 is a side view of a leg and the reinforced opening.

FIG. 9 is a side view of a leg 10 and the reinforced opening 42. The leg 10 sticks through the reinforced opening 42 at the near end 20 of side belt 14.

Figure 10:
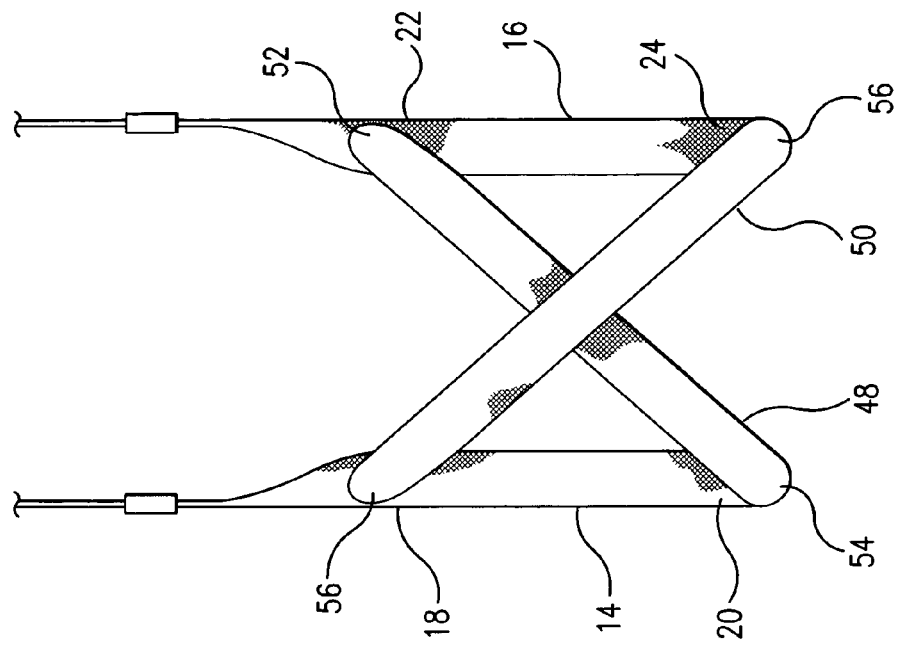
FIG. 10 is a top view of a belt configuration for a two legged seat with cross belts.

FIG. 10 is a top view of a belt configuration for a two legged seat with cross belts 48 and 50. The cross belt 48 is attached at the near end 20 of the side belt 14 at the distal end 54. The distal end 22 of the side belt 16 is attached to the near end 52 of the cross belt 48. The cross belt 50 is attached at the near end 24 of side belt 16 at its distal end 58. The near end 56 of the cross belt 50 is attached to the near end 16 of the side belt 14. This forms the support structure of this belt configuration.

FIG. 11 is a top view of a belt configuration for a two legged seat with cross belt 48, 50 and a front support belt 68. The cross belt 48 is attached at the near end 20 of the side belt 14 it's the distal end 54. The distal end 22 of the side belt 16 is attached to the near end 52 of the cross belt 48. The cross belt 50 is attached at the near end 24 of side belt 16 at its distal end 58. The near end 56 of the cross belt 50 is attached to the near end 16 of the side belt 14. The front support belt 68 runs from the near end 20 of the side belt 14 to the near end 24 of the side belt 16. This front support belt 68 gives added support to this embodiment. This forms the support structure of this belt configuration.

FIG. 12 is a top view of a belt configuration for a two legged seat with cross belt 48, 50 and openings 42 therethrough for the support legs. The cross belt 48 is attached at the near end 20 of the side belt 14 at the distal end 54. The distal end 22 of the side belt 16 is attached to the near end 52 of the cross belt 48. The cross belt 50 is attached at the near end 24 of the side belt 16 at its distal end 58. The near end 56 of the cross belt 50 is attached to the near end 16 of the side belt 14. This forms the support structure of this belt configuration.

Figure 13:
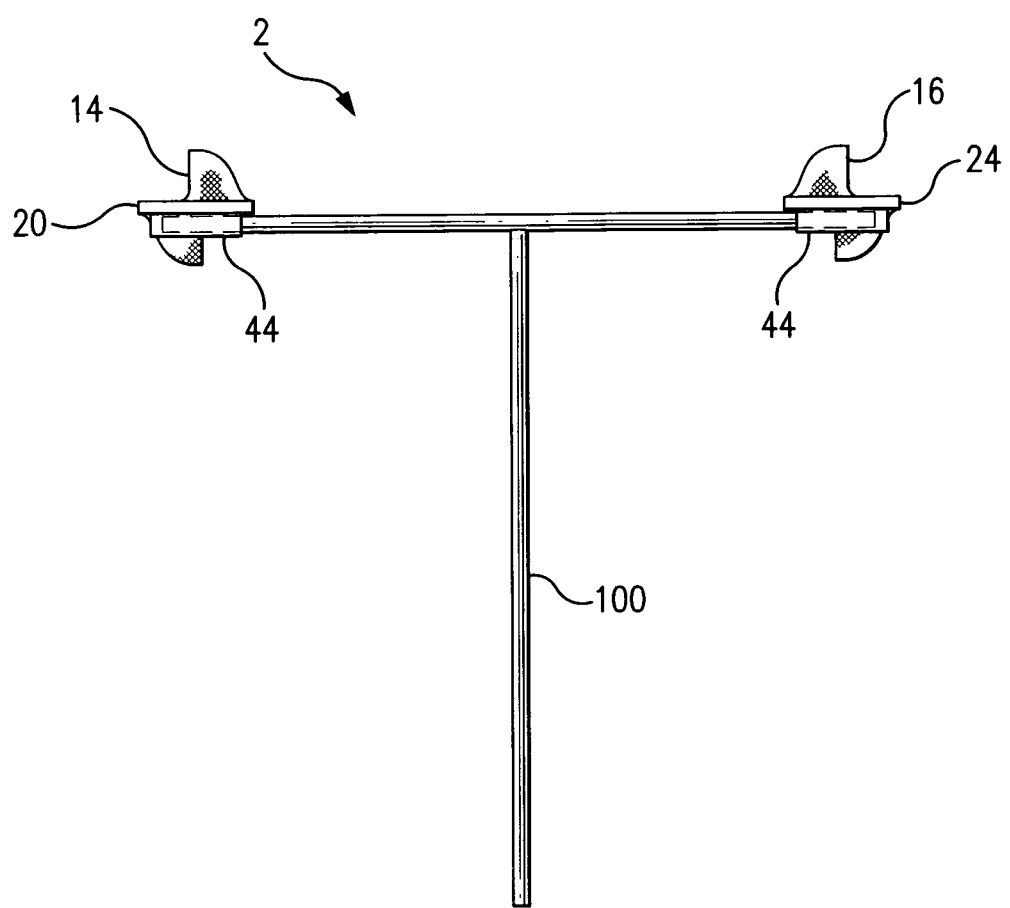
FIG. 13 is a front view of a t-bar leg of the seating device.

FIG. 13 is a front view of a t-bar leg 100 of the seating device 2. Here the cups 44 are on a horizontal plane to accommodate the t-bar leg 100. As the other embodiments one cup 44 is attached to the distal end 20 of the first side belt 14. The other cup 44 is attached to the distal end 24 of the second side belt 16. The t-bar leg 100 supports the seating device 2.

Figure 14:
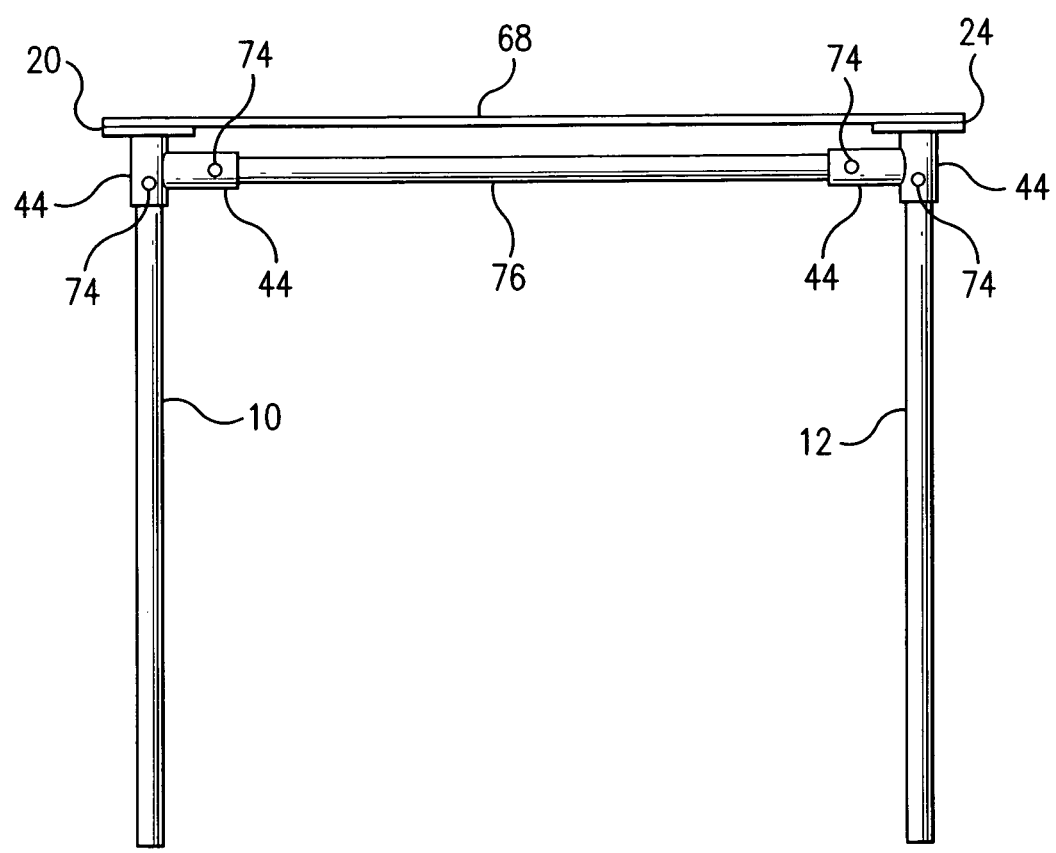
FIG. 14 is front view of the seating device with a spreader stick running horizontally and set screw fasteners.

FIG. 14 is front view of the seating device 2 with a spreader stick 76 running horizontally and set screw 74 as fasteners. The front legs 10 and 12 fit into cups 44 and are secured by the fasteners; in this embodiment they are set screws 74. This embodiment has a set of cups 44 that run horizontal to the other cups 44. The horizontal cups are arranged to accept a spreader stick 76 and secured via the fasteners 74. Also visible are the near end 20 of side belt 14 and the near end 24 of side belt 16. Also visible is the front support belt 68.

The buckle 8 of the various embodiments is comprised of a first securing belt 26 that has a female portion 60 of a buckle near the distal end 30 and the second securing belt 16 that has a male portion 62 of a buckle near the distal end 34.

The legs 10 of the instant device 2 are attached through various methods including reinforced openings 42, cups 44 attached to the bottom surface 72 of the side belts 14 and 16. The cups 44 of the invention are manufactured from metal, cloth, plastic and wood.

The seating device 2 has numerous belt configurations including a single support belt 68.

For purposes of concealment and UV protection in one embodiment all but the securing belts are covered with a fabric sheet.

The legs 10 and 12 of the instant invention are manufactured from metal, plastic fiberglass and wood. One embodiment allows for the use of materials found in the outdoor environment including sticks and tree branches.

The belt junctions 38 and 40 are joined and reinforced by sewing, staples and metal fasteners. In one embodiment the fasteners are bolts, in another they are metal staples. The legs of the device 2 are of various configurations including foldable and non foldable. The legs in another embodiment are segmented.

The pack 4 is also capable of housing the seating device.

What is claimed is:

1. A seating device, said device comprising in combination:
   a. two support legs;
   b. a pair of side belts, each said side belt having a near end and a distal end;
   c. a pair of cross belts, each said cross belt having a near end and a distal end;
   d. a first securing belt, said first securing belt having a near end and a distal end, and, e. a second securing belt, said second securing belt having a near end and a distal end;
   each said cross belt fixedly attached to a said side belt such that each said near end of a said cross belt is fixedly attached to a said near end of a said side belt to form a first junction with a bottom surface;
   each said distal end of each said cross belt being fixedly attached to a said distal end of a said side belt;
   said distal end of each said side belt fixedly attached to a said near end of a securing belt such that there is formed from said distal end of each said cross belt and said distal end of each said side belt and the said near end of each said securing belt, a second junction;
   each said first junction having a receptacle for holding a leg.

2. A seating device as claimed in claim 1 wherein said first securing belt has a female portion of a buckle near said distal end and said second securing belt has a male portion of a buckle near said distal end.

3. A seating device as claimed in claim 1 wherein said receptacles are reinforced openings in said first junction of the said belts.

4. A seating device as claimed in claim 1 wherein said receptacles are cups attached to said bottom surface of said first junction of said belts.

5. A seating device as claimed in claim 4 wherein said cups are manufactured from a material selected from the group consisting of metal, cloth, plastic and wood.

6. The seating device as claimed in claim 1 wherein, in addition, there is a single belt extending from said near end of one side belt to said near end of the opposite side belt.

7. The seating device as claimed in claim 1 wherein all but said securing belts are covered with a fabric sheet.

8. The seating device as claimed in claim 1 wherein said legs are manufactured from a material selected from the group consisting of metal, fiberglass, plastic and wood.

9. The seating device as claimed in claim 8 wherein said wood is wooden sticks.

10. The seating device as claimed in claim 9 wherein said wooden sticks are tree branches.

11. The seating device as claimed in claim 1 wherein said second junction of said distal ends of said side belts and said cross belts and said near end of said securing belts are joined and reinforced.

12. The seating device as claimed in claim 11 wherein said reinforcement is sewing.

13. The seating device as claimed in claim 11 wherein said reinforcements are metal fasteners.

14. The seating device as claimed in claim 13 wherein said metal fasteners are bolts.

15. The seating device as claimed in claim 13 wherein said metal fasteners are metal staples.

16. The seating device as claimed in claim 1 wherein said legs are not foldable.

17. The seating device as claimed in claim 1 wherein said legs are foldable.

18. A seating device, said device comprising in combination:
   a. a support leg;
   b. a pair of side belts, each said belt having a near end and a distal end;
   c. a first securing belt, said first securing belt having a near end and a distal end, and,
   d. a second securing belt, said second securing belt having a near end and a distal end;
   e. each said side belt being secured to the other said side belt at said near ends thereof such that a first junction is formed having a bottom surface;
   said distal end of each said side belt fixedly attached to a near end of a securing belt such that there is formed from said distal end of each said side belt and said near end of each said securing belt, a second junction;
   said first junction having a receptacle for holding said leg.

19. A seating device as claimed in claim 18 wherein said first securing belt has a female portion of a buckle near said distal end and said second securing belt has a male portion of a buckle near said distal end.

20. A seating device as claimed in claim 18 wherein said receptacle is a reinforced opening in said first junction of said belts.

21. A seating device as claimed in claim 18 wherein said receptacle is a cup attached to said bottom surface of said first junction of said belts.

22. A seating device as claimed in claim 21 wherein said cups are manufactured from a material selected from the group consisting of metal, cloth, plastic and wood.

23. The seating device as claimed in claim 18 wherein all but the said securing belts are covered with a fabric sheet.

24. The seating device as claimed in claim 18 wherein said legs are manufactured from a material selected from the group consisting of metal, fiberglass, plastic and wood.

25. The seating device as claimed in claim 22 wherein said wood is a wooden stick.

26. The seating device as claimed in claim 25 wherein said wooden stick is a tree branch.

27. The seating device as claimed in claim 18 wherein said second junction of said distal ends of said side belts and said near end of said securing belts are joined and reinforced.

28. The seating device as claimed in claim 27 wherein said reinforcement is sewing.

29. The seating device as claimed in claim 27 wherein said reinforcement is a metal fastener.

30. The seating device as claimed in claim 29 wherein said metal fastener is a bolt.

31. The seating device as claimed in claim 29 wherein said metal fastener is a metal staples.

32. The seating device as claimed in claim 18 wherein said leg is not foldable.

33. The seating device as claimed in claim 18 wherein said leg is foldable.

34. In combination, the seating device of claim 1 and a portable pack for housing said seating device when not in use.

35. The combination of claim 34 wherein each of said securing belts is positioned in a top opening in said pack and each said securing belt exits the said pack through openings in the back of said pack.

36. A seating device, said device comprising in combination:
   a. a first side belt and a second side belt, each said side belt having a near end and a distal end;
   b. a first securing belt, said first securing belt having a near end and a distal end, and,
   c. a second securing belt, said second securing belt having a near end and a distal end;
   d. said near end of said first securing belt being joined to said near end of said first side belt and the said end of said second securing belt being joined to said near end of said second side belt;
   e. said distal ends of said side belts being joined together with a cross belt to form two separate junctions having a bottom surface;

f. each said junction having a receptacle attached thereto for holding a cross support bar, said cross support bar having a leg attached near a center point thereof.

37. A seating device, said device comprising in combination:
a. two support legs;
b. a pair of side belts, each said side belt having a near end and a distal end;
c. a pair of cross belts, each said cross belt having a near end and a distal end;
d. a first securing belt, said first securing belt having a near end and a distal end, and,
e. a second securing belt, said second securing belt having a near end and a distal end;
  each said cross belt fixedly attached to a side belt such that each said near end of a said cross belt is fixedly attached to a near end of a said side belt to form a first junction with a bottom surface;
  each said distal end of each said cross belt being fixedly attached to a distal end of a side belt;
  said distal end of each said side belt fixedly attached to a near end of a said securing belt such that there is formed from said distal end of each said cross belt and said distal end of each said side belt and said near end of each said securing belt, a second junction;
  each said first junction having a receptacle for holding a leg, said receptacle further comprising a horizontal cup supported by said receptacle, said horizontal cups supporting a cross support bar.

\* \* \* \* \*